United States Patent Office 3,317,452
Patented May 2, 1967

3,317,452
MANUFACTURE OF DESTATICIZED RESINOUS
POLYMERIC ARTICLES
Arnold S. Louis, Hastings-on-Hudson, and Myron A. Coler, Scarsdale, N.Y. (both of 155 Waverly Place, New York, N.Y. 10014)
No Drawing. Filed May 4, 1965, Ser. No. 453,177
18 Claims. (Cl. 260—32.6)

This application is a continuation-in-part application of our copending application Ser. No. 776,430 filed Nov. 26, 1958, which was a continuation-in-part of application Ser. No. 476,051 filed Dec. 17, 1954, as a continuation-in-part of application Ser. No. 291,815 filed June 14, 1952, all of said applications being now abandoned.

The present invention relates to electro-conductive fillers for synthetic resin molding polymers, to synthetic resin molding pellets incorporating such fillers, to shaped bodies molded from such molding pellets and to processes for preparing the fillers, the molding pellets and the shaped bodies.

The terms "thermoplastic synthetic resinous molding polymer," "polyvinylidene polymer," "synthetic resin," or simply "polymer," used throughout the specification and the claims, include polymers of vinylidene monomers, such as polyvinyl chloride, vinyl chloride-vinyl acetate copolymers, vinyl chloride-vinylidene chloride copolymers, polyvinyl formal, polyvinyl acetal, polyvinyl butyral, polyvinyl carbazole, polyvinylidene chloride, polystyrene, polyethylene, and acrylic resins such as polymethylmethacrylate.

The term "vinylidene" as used herein is intended to define monomers containing a polymerizable unsaturated

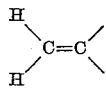

structure and is generic to vinyl and vinylidene monomers. Each of the polymers specifically enumerated in the preceding paragraph is a polymer or copolymer of a vinylidene monomer, so defined.

For purposes of reference in examples described herewith, certain of the polymers are given reference numbers as follows:

(1) Polystyrene
(2) Copolymers of vinyl chloride and vinyl acetate
(3) Polymethylmethacrylate
(4) Polyvinyl chloride
(5) Polyvinylidene chloride
(6) Polyethylene It is common for molded articles made from the above mentioned materials to have electrostatic charges built up on their surfaces upon ejection from the mold. The presence of the charges causes the attraction of dust, lint and other fine debris which render the article unsightly. Invariably, attempts to wipe the article so that it may be displayed for sale results in the generation of additional static charges with resultant dust attraction and scratching of the surface unless specially treated cloths and extreme care are used.

The need for amelioration of the dust collecting tendencies of articles molded from polymers mentioned has long been appreciated, as evidenced by the extensive literature on the subject.

In general, the approaches of the prior art include the surface treatment of the molded article. Surface coating is inherently undesirable; such a coating is generally of a temporary nature, and requires an additional handling operation. Such coatings exhibit poor resistance to the wear and tear of normal everyday use such as washing with soap and water.

Attempts to incorporate destaticizing fluids in the polymeric molding compositions have been generally directed to fluids soluble in the polymer. Fluids which are soluble become molecularly dispersed and accordingly, as a general rule, are not truly effective unless inordinately large quantities are used. The properties of a polymer are adversely affected by the presence of excessively large quantities of free fluid, as for instance, by decreasing the tensile strength and lowering of the softening temperature.

It has been discovered that a destaticized molded polymeric article may be obtained by incorporating in the polymer an electroconductive organic liquid which is not, or only partially, soluble in the polymer and otherwise chemically inert in relation thereto, the liquid being added in a quantity in excess of that which is soluble in the polymer so that there is uncombined, undissolved destaticizing agent present. The carrier for the undissolved liquid is a feature of this invention, and is described in greater detail hereinafter.

The invention provides a means of incorporating a fluid destaticizing material into the molding composition so efficiently that an extremely small proportion of fluid in the composition can produce a destaticized molded plastic article. The use of a small proportion of fluid avoids introducing undesired changes in the physical properties of the plastic. The molded shaped articles made in accordance with this invention are inherently destaticized and do not require the undesirable surface treatment of the prior art. Further, it has been found that the product of this invention retains antistatic properties for long periods despite washing with soap and water.

Accordingly, it is an object of this invention to provide a polymeric plastic article substantially nonsusceptible to the accumulation of electrostatic charges.

Another object is to provide a material for incorporation with a polymeric plastic molding powder which will render a resulting molded article free of the effects of electrostatic charges.

Still another object is to provide a method of making a static dissipating molded polymeric plastic article.

A still different object is to provide a simple low cost method of producing static dissipating molded polymeric articles.

It is a particular object of this invention to provide a polymeric molding composition for injection molding articles having antistatic properties.

A further object is to provide a material containing a fluid destaticizing agent suitable for incorporation with comminuted polymeric particles to form a molding composition such that the fluid is not readily expressed in molding.

Still further objects and advantages of this invention are made apparent by the following description.

The term "sorption" as used herein is intended to embrace absorption, adsorption and other like processes by which a solid material and a fluid adhere to each other.

The present invention is based on the discovery that by the use of a sorptive particulate carrier, fluids may be incorporated in polymeric molding compositions without dissolving the fluid in the polymer. Surprisingly, the fluid, although non-homogeneously present in the composition, is not expressed in molding.

In carrying out the invention carrier particles having a size of smaller than 40 microns and having suitable sorption characteristics are treated with a liquid destaticizing agent. The treated carrier may be mixed with polymer particles and the mixture molded to produce static dissipating polymeric articles. It has been found that the resulting article will have a surprisingly high conductivity in relation to the amount of destaticizing material incorporated therein; and thus, by this technique it is possible to produce molded polymeric products having relatively good static charge dissipation properties but structural properties substantially the same as those of untreated polymer. The molding powder which results may be formed by conventional molding techniques into any of various desired solid void free shapes without expressing the fluid.

Suitable carrier materials are those having the ability to hold considerable quantities of fluid destaticizing material under conditions of molding. They may be organic or inorganic and should have a large specific surface which may reside, in part, in extensive internal pores, such as occur in diatomaceous earth. Generally, finely divided carrier materials are preferred for their greater surface as compared to an equal quantity of coarser material. The carrier material must be stable, free of volatile constituents, chemically inert and insoluble in the organic liquid and the polymer under normal molding conditions for the synthetic resin. The carrier material should be readily wetted by the destaticizing material.

Some carrier materials may serve a dual purpose; for example, they may also serve as coloring pigments. Suitable sorptive carrier-pigment material include oxides of zinc, lead, chromium, antimony, iron, mercury and copper oxides, as well as titanium dioxide and silicon dioxide, and alumina hydrate. Other suitable carrier-pigments are inorganic salts, such as lead carbonate, calcium carbonate (including limestone flour), lead sulfate, calcium sulfate, barium sulfate (including barytes), cadmium red, zinc sulfide, antimony sulfide, cadmium sulfide, lead chromate, zinc chromate, strontium chromate, calcium chromate, zinc borate, magnesium silicate, aluminum silicate, mica, talc, clay, bentonite, and diatomaceous earth. Diatomaceous earth is particularly useful in the production of translucent molded polymeric articles. Organic pigments, such as toluidine red, para red and copper phthalocyanide; and organic fibrous materials, such as wood flour, alpha-cellulose and asbestos fibers may be likewise employed as carriers.

For purposes of reference in examples described hereinafter, certain of the carriers are given reference numbers as follows:

(1) Titanium dioxide, particle size less than 2 microns which has a sorption factor, S, of 3.2, density of 4.3 g./cc.
(2) Silicon dioxide, particle size less than 40 microns, which have a sorption factor, S, of 0.95.
(3) Silicon dioxide, average particle size of 3 to 5 microns which has a sorption factor, S, of 11.6.
(4) Ground asbestos fiber, particle size, less than 40 microns, sorption factor, S, of 2.3, density of 3.0 g./cc.
(5) Copper phthalocyanine pigment, particle size, less than 10 microns, sorption factor, S, of 1.18.
(6) Magnesium carbonate, particle size, less than 44 microns, sorption factor, S, of 3.3, density of 3.0 g./cc.

It is appreciated that many of the enumerated materials are commonly employed as fillers for polymeric compositions. An essential point of distinction exists between the compositions of the present invention and the conventional filled plastic molding materials. It should be noted that, as normally compounded (e.g. by extrusion and chopping), the fillers are encapsulated in the synthetic resin and hence are not in a condition to receive the liquid destaticizing material. In fact, as distinctly pointed out hereinafter, care must be exercised in carrying out this invention to avoid encapsulating the carrier before the destaticizing agent has been sorbed onto the carrier by sorption phenomena.

It has been determined that the carrier must have at least a minimum capacity for sorption of the destaticizing material. This property may be conveniently determined by a modification of the well known oil absorption test as follows:

15 grams of carrier are placed in a 600 cc. Ehrlenmeyer flask. Liquid (preferably the destaticizing material of interest) is added in small measured quantities with intensive shaking until just sufficient liquid has been added to collect the carrier into a single ball-like mass. The sorption factor, S, is the ratio of the volume of fluid to the volume of carrier in the ball-like mass. Expressed in more readily measurable parameters, $S=DL/C$ where L is the volume of fluid added, C is the weight, and D is the absolute density of the carrier used, all expressed in consistent units.

It has been found that suitable carrier materials are those having a sorption factor of at least 0.5.

Destaticizing agents useful for this invention include electroconductive organic liquids or substances, such as certain waxes, which may be readily rendered liquid, which do not chemically react with the sorptive carrier material, are insoluble therein and have no solvent property therefor. These organic liquids must be stable under normal molding conditions for the polymer employed and have a boiling point of at least 190° C. at 760 mm. pressure so as to minimize loss of destaticizing agent during the molding operation and from the molded article. Materials which will decompose during molding generally form gases which are difficult to control and therefore such unstable compounds should not be used. Thus in Example 30, it is shown that molding composition containing formamide (boiling point 211° C. with decomposition) gave satisfactory compression moldings but had some tendency to gas during injection molding at temperature of 400° F. It is essential that the organic fluid be insoluble in the polymer or at most partially soluble therein and have at most a slight solvent property therefor, being chemically inert in relation thereto, except for the possible partial solubility. As illustrated in Example 15, nitrobenzene, an organic liquid which may meet other destaticizing properties but is a strong solvent for the polymer, is useless for the purposes of the invention.

If the electroconductive liquid is partly soluble in the polymer, an amount in excess of that which is dissolved in the polymer must be employed so that there is present a quantity of undissolved destaticizing agent for combination with the sorptive carrier.

Thus taking the specific case of polystyrene and polyethylene glycol having a molecular weight of 400, it has been determined by the commonly used film transparency test that the polystyrene dissolves 2% of its volume of the polyethylene glycol. If 5% of the polyethylene gylcol is employed with polystyrene in making a composition of this invention, then 2% will be dissolved in the polystyrene leaving only 3% available as a destaticizing agent. The importance of the carrier to prevent this 3% of polyethylene gylcol from being expressed may be appreciated.

The minimum quantity of destaticizing agent may be employed is therefore in part a function of its solubility in the particular polymer. The preferred ranges that are stated hereinafter are in terms of the undissolved agent present.

The solubility of a particular destaticizing agent in the polymer may be readily determined by a simple film test. The test comprises casting thin films of the composition containing various measured amounts of additives and determining at which concentration the film becomes optically hazy.

In the referenced parent applications it has been disclosed that suitable destaticizing agents are (1) organic materials, (2) have physical characteristics which in general terms may be said to assure stability under molding conditions, and (3) have suitable electrical properties. The presence of the adequate electrical properties may be determined by measuring either the dielectric constant, as disclosed in the parent application or by measurement of the electrical conductivity of the material. A conductivity of at least $10^{-9}$ mho/cm. at 20° C. has been found to be essential. The conductivity measurement is more readily made therefore the conductivity criterion will be referred to hereinafter.

It should be understood that many fluids which are inherently non-conductive may be rendered conductive by the presence of small amount of ionizable materials so as to meet the conductivity requirement. Usually such ionizable substances are present as normal impurities in the commercially available forms of the fluids. Ionizable impurities may also be derived from the polymer or sorptive carrier particles which are used or by absorption from the air.

Throughout the specifications and claims of this application, whenever destaticizing fluid materials are mentioned, the commonly available technical grade of these materials is intended. In using grades of greater purity, containing an inadequate amount of ionizable material, the deficiency can, if necessary, be eliminated by deliberate addition of such ionizable material. As is brought out by the various examples provided hereinafter, the quantity of destaticizing liquid employed may be reduced if there are incorporated additional agents which contribute ions to the destaticizing fluid. These agents include ionizable materials such as formamide, acetamide and salts, including lithium bromide, chelate compounds or their salts, and salts of quaternary ammonium compounds. If the destaticizing agent is highly conductive (conductivity $>10^{-7}$ mho/cm.) or rendered so by the introduction of highly ionizable materials, then as little as 1 part by volume of undissolved agent based on 100 parts of polymer may be employed with satisfactory results. On the other hand destaticizing agents which are only moderately conductive (conductivity in the range $10^{-7}$ to $10^{-9}$ mho/cm.) and contain little ionizable material must be used in larger quantities, 3 parts by volume or more per 100 parts of polymer.

Thus, unmodified polyethylene glycol having a molecular weight of approximately 1500 should be added in an amount exceeding 5 parts by volume of a destaticized composition based on 100 parts by volume of the polystyrene. Since this polyethylene glycol is soluble to the extent of about 2 parts in 100 parts, by volume, of polystyrene there are about 3 parts by volume of the destaticizing agent undissolved and available to perform its nominal function.

However, if a 10% (by weight) solution of lithium bromide in the same polyethylene glycol is used as the destaticizing liquid, 3 parts by volume of this solution, based on 100 parts by volume of polystyrene, will render a polystyrene molding composition antistatic. In this latter case only 1 part by volume of the polyethylene glycol per 100 parts by volume of the polymer is undissolved and available as an active destaticizing agent.

Thus while we have stated the minimum quantities of polyethylene glycol which are to be employed as the destaticizing agent we prefer to use at least 2 parts by volume per 100 parts by volume of polymer in addition to this minimum quantity in order to obtain products of enhanced antistatic properties.

In both of the above described examples it is assumed that a suitable quantity of carrier is employed as hereinafter described.

If a totally insoluble and highly conductive agent (conductivity $>10^{-7}$ mho/cm.) is employed then only 1 part total agent need be employed.

It should be observed that an organic fluid of low or moderate conductivity can be upgraded by the incorporation of water or other liquid of high dielectric constant. The conductivity criterion for a suitable destaticizing fluid given above is to be applied to such combinations in their entirety.

Wetting agents such as the sodium salts of sulfated long chain fatty alcohols or sodium naphthenate may be utilized to improve wetting of the carrier, particularly those materials having fine internal openings.

The proper amount of carrier to be used is a function of its sorption factor, which is readily determined by the modifications of the well known oil absorption test given earlier, and of the amount of destaticizing material used.

In order to obtain the advantages of this invention, without undue addition of filler type material to the polymer, the volume ratio of destaticizing agent to carrier should be at least 0.18 times the sorption factor as herein described.

If insufficient carrier is used for the quantity of destaticizing fluid, the resultant molding will be objectionably wet or its physical properties may even be impaired.

It has been experimentally determined that the volume ratio of destaticizing agent to carrier must not be permitted to exceed a certain ratio.

In order to avoid moldings having a wet feeling, this maximum ratio has been determined to be 0.67 times the sorption factor. By way of illustration the following example is provided:

10 cc. (actual volume) of finely divided silica having a particle size in the range of 3 to 5 microns, was mixed with a sufficient quantity of a given liquid to form a single ball-like mass in accordance with the standard oil absorption test. The quantity of liquid necessary was found to be 116 cc. Therefore the sorption factor was 116/10 or 11.6. The actual volume of the silica was determined by dividing weight by density.

Accordingly the maximum ratio of the specified liquid to be employed with this particular silica is between 11.6×0.18 or 2.09 cc. and 11.6×0.67 or 7.77 cc. of liquid per cc. of carrier. To state the matter conversely, at least 0.128 cc. but no more than 0.481 cc. of the specific silica must be used for each cc. of the particular liquid.

On the other hand the maximum amount of carrier and destaticizing fluid to be employed is governed by their effect on the properties of the molded article.

The maximum amount of carrier, destaticizing agent or other additives employed should be not more than 50% of the total volume of the molding composition.

It was earlier pointed out that in conventional thermoplastic synthetic resin molding polymers, having incorporated therein fillers which would be suitable as carriers, the fillers are encapsulated and therefore are not in a condition to receive the destaticizing liquid.

In combining the ingredients of the molding compositions of this invention care must be exercised that the carrier material not become encapsulated before it has received the destaticizing liquid.

One method of incorporation is to pretreat the carrier with the destaticizing liquid prior to introducing it into the polymer. However, for convenence, it is preferred to tumble or ball mill, in the cold, comminuted polymer particles, such as polystyrene beads, with the destaticizing agent in fluid form and the finely divided carrier.

The mixture may then be directly molded into void-free articles by conventional injection or compression molding techniques.

A molding composition which is stable, which can be conveniently handled in the molding plant and which will not tend to segregate into its constituents on shipment can be prepared by introducing the previously described tumble mix into an extruder, extruding and chopping the conventional sized molding pellets. For this purpose a twin screw extruder is preferred. If the vigorous extrusion incorporation technique is employed then it is preferred that slightly more destaticizing agent be used than if the composition is molded directly after being tumble mixed.

The operation may alternatively be carried out on a Banbury mixer by observing certain precautions. The destaticizing agent should be introduced together with the carrier material into the mixer. If the polymer and carrier are masticated together in the mixer prior to the introduction of the destaticizing agent then the carrier becomes encapsulated and not receptive to the destaticizing agent.

In practice it has been found that the greater the amount of intensive mixing to which the composition is exposed, the greater the amount of destaticizing agent which should be employed for a given degree of destaticization. Thus for a given concentration of destaticizing agent, incorporation by simple tumbling followed by compression molding will yield maximum destaticization of the resulting molded article.

Where objects are to be formed by injection molding or by molding at elevated temperatures, we have found that greater allowance should be made for volatilization of destaticizing fluid than in the case of compression or lower temperature molding.

In the molding of objects from the non-electrostatic polymer compositions of this invention, it is preferred that a temperature in the lower part of the usual molding range for the polymer be used in order to minimize vaporization losses of the conductive material and for convenience of molding.

The polymer particles may already contain compounding ingredients such as lubricants, plasticizers, pigment dyestuffs, pigments, and fillers, like alpha cellulose, wood flour, and mica which compounding ingredients are not to be confused with the destaticizing agents or carriers of this invention. In instances where particles of the compounding ingredients are incorporated into the polymer prior to treatment with the destaticizing agent they are encapsulated so that the destaticizing agent cannot sorb to the surface of the particles.

Among suitable destaticizing agents are water-soluble materials of the specified stability and chemical inertness, having a vapor pressure of 760 mm. or less at 190° C., and a conductivity greater than $10^{-9}$ mho/cm. at 20° C., said agents including by way of example and without intending to be limiting those members of the following list meeting the above requirements: hydroxyalkylated alkylene diamines wherein the alkylene radicals contain from 2 to 6 carbon atoms and the hydroxyalkyl radicals contain from 2 to 8 carbon atoms; hydroxyalkylated polyethylene polyamines wherein the polyethylene radicals contain 2 to 4 ethylene groups and the hydroxyalkyl radicals contain 2 to 8 carbon atoms; acyclic polyalkanolamines containing at least two hydroxyalkyl groups containing from 2 to 8 carbon atoms; ammonium salts including quaternary ammonium salts of any of the aforementioned agents; compounds resulting from the condensation of ethylene oxide with a hydrophobic base formed by the condensation of propylene oxide with propylene glycol represented empirically by:

$$HO-(C_2H_4O)_a(C_3H_6O)_b(C_2H_4O)_c-H$$

wherein $b$ is an integer such that the molecular weight of the polyoxypropylene hydrophobic base is from 1001 to 1800 and $a$ and $c$ are integers, the total of which is such that the polyoxyethylene (hydrophilic unit) percentage in the total molecule is from about 20 to about 80%; products of the sequential addition of propylene oxide and ethylene oxide to ethylene diamine wherein the molecular weight of the initial addition product between propylene oxide and ethylene diamine has a molecular weight greater than 2000 and said product of sequential addition contains more than 60% by weight of oxyethylene groups; amides, nitriles and polyhydroxy compounds. Nitriles, while effective for the purpose of the invention, should not be used where the products may come in contact with food, because of the poisonous nature of the nitriles.

Especially effective destaticizing agents may be made by combining selected alkanolamines, such as triethanolamine, with selected carboxylic acids. By reacting the triethanolamine with selected alkyl carboxylic acids in approximately equi-molar ratios, while cooling the reacting materials to prevent heating above 65° C., a product is formed, 2% of which proves to be a better additive in terms of destaticization than 3% of the triethanolamine used alone. A smaller quantity of additive is preferred since less lowering of the heat distortion point of the resin results. Perhaps of even greater significance is the finding that, if the 2% additive contains 80 parts of the triethanolamine by weight and only 20 parts by weight of the aforementioned product, it is still superior in effect to 3% by weight of the triethanolamine used alone.

The preferred amides are the aliphatic amides of alkyl- over a large range. The alkanolamine may be present in the range of 30 to 99 parts for each 100 parts by weight of the product of combining equi-molecular quantities of acid and alkanolamine.

Other especially desirable destaticizing compositions are those in which the alkanolamine is combined with certain amides, with cooling to keep the temperature of the mixture below 65° C. The mixture of alkanolamine and amide may contain from 1 to 70 mol percent of amide.

In the above described alkanolamine-acid and alkanolamine-amide combinations, the alkanolamine portion may comprise any primary, secondary or tertiary alkanolamine of the formula

wherein $R_1$, $R_2$, and $R_3$ are hydrogen or alkyl or alkanol groups, at least one being an alkanol with from 2 to 8 carbon atoms and the alkyl groups, if present, having from 1 to 8 carbon atoms.

Particularly useful alkyl carboxylic acids include both the mono-basic alkyl carboxylic acids having from 2 to 18 carbon atoms in the molecule and di-basic alkyl carboxylic acid having from 4 to 18 carbon atoms in the molecule. The most satisfactory alkyl carboxylic acids are the alkyl mono-carboxylic acids having from 6 to 12 carbon atoms in the molecule.

The preferred amides are the aliphatic amides of alkyl-mono and di-carboxylic acids having from 4 to 18 carbon atoms in the molecule.

While a list of destaticizing compounds has been given above, the criterion of conductivity previously mentioned is preferred, however, as defining those substances which may be used to advantage as destaticizing agents for the purposes of this invention. The liquid must be chemically inert to and insoluble in the sorptive material and insoluble or at most partially soluble in the resin, being otherwise chemically inert to the resin.

For purposes of reference in examples described hereinafter, certain destaticizing agents are given reference numbers as follows:

| Reference Number | Destaticizing Agents | Conductivity mho/cm. |
|---|---|---|
| 1 | N-acetylethanol amine | $5 \times 10^{-8}$ |
| 2 | Formamide | $4 \times 10^{-6}$ |
| 3 | Diisobutanolamine | $10^{-8}$ |
| 4 | Triisopropanolamine | $10^{-8}$ |
| 5 | Trioctanolamine | $10^{-9}$ |
| 6 | N-butyl diethanolamine | $3 \times 10^{-8}$ |
| 7 | Triethanol ammonium acetate | $10^{-5}$ |
| 8 | Glyconitrile [1] | $10^{-6}$ |
| 9 | Totally hydroxypropylated ethylene diamine. | $10^{-9}$ |
| 10 | Totally hydroxyoctylated ethylene diamine. | $10^{-9}$ |
| 11 | Totally hydroxyethylated hexamethylene diamine. | $10^{-9}$ |
| 12 | Tri-hydroxyethylated ethylene diamine | $10^{-8}$ |
| 13 | Totally hydroxypropylated ethylene diammonium diacetate. | $10^{-6}$ |
| 14 | Totally hydroxypropylated ethylene diammonium hydrogen phosphate. | $10^{-7}$ |
| 15 | Totally hydroxypropylated ethylene dimethyl diammonium dichloride. | $10^{-7}$ |
| 16 | Monohydroxyethyl trihydroxypropyl ethylene diamine. | $10^{-8}$ |
| 17 | Pentahydroxyethylated diethylene triamine. | $>10^{-9}$ |
| 18 | Totally hydroxyoctylated tetraethylene pentamine. | $>10^{-9}$ |
| 19 | Pentahydroxypropylated diethylene triamine. | $>10^{-9}$ |
| 20 | Hexahydroxyethylated triethylene diamine diammonium diacetate. | $10^{-8}$ |
| 21 | Glycerine | $5 \times 10^{-8}$ |
| 22 | Polyethylene glycol 200 | $2 \times 10^{-6}$ |
| 23 | Polyethylene glycol 400 | $>10^{-6}$ |
| 24 | Polyethylene glycol 1540 | $10^{-8}$ |
| 25 | 2 methyl, pentanediol 2,4 | $10^{-5}$ |
| 26 | Isopropanol | $3 \times 10^{-6}$ |
| 27 | Polyethylene glycol 1540 (100 parts), acetamide (10 parts). | $>10^{-5}$ |
| 28 | Polyethylene glycol 1540 (100 parts), lithium bromide (10 parts). | $>10^{-6}$ |
| 29 | Polyethylene glycol 1540 (100 parts) alkyl dimethyl benzyl ammonium chloride wherein the alkyl group ranges from 8–18 carbon atoms (10 parts). | $>10^{-5}$ |
| 30 | Polyethylene glycol 1540 (100 parts), stearamidopropyl dimethyl hydroxyethyl ammonium dihydrogen phosphate (10 parts). | $>10^{-5}$ |
| 31 | $HO(C_2H_4O)_a(C_3H_6O)_b(C_2H_4O)_cH$ wherein the polyoxypropylene base has a molecular weight in the range of 1001 to 1200 and the polyoxyethylene percentage in the total molecule is 40%. | $>10^{-8}$ |
| 32 | Product of the sequential addition of propylene oxide and ethylene oxide to ethylene diamine wherein the molecular weight of the oxide addition product is 3,600 to 4,500 and the final product contains 80 to 90% by weight of ethylene oxide. | $>10^{-8}$ |
| 33 | Nitrobenzene | $5 \times 10^{-9}$ |

[1] Poisonous and should not be employed for plastic food containers.

Further destaticizing agents were prepared by measuring a quantity of an alkanolamine into a beaker and gradually adding a quantity of an alkyl carboxylic acid or of an alkyl amide with vigorous stirring by means of a high speed mechanical stirrer. Mixing was done with the beaker immersed in cold water bath. The temperature of the mixture was maintained below 50° C. The following table lists the materials used to prepare destaticizing agents in the above fashion:

| Reference Number | Components | Parts by Weight |
|---|---|---|
| 34 | Triethanolamine, gram mol (149 g.) | 1 |
| | Acetic acid, gram mol (60 g.) | 1 |
| 35 | Dimethyl isopropanolamine | 80 |
| | Acetic acid | 20 |
| 36 | Triethanolamine | 60 |
| | Lauramide | 40 |
| 37 | N-butyl diethanolamine | 60 |
| | Heptanoic acid | 40 |
| 38 | Trioctanolamine | 60 |
| | Caprylic acid | 40 |
| 39 | Hexyl diethanolamine | 60 |
| | Caprylamide | 40 |
| 40 | Diethanolamine | 60 |
| | Lauramide | 40 |
| 41 | Triethanolamine | 60 |
| | Oleic acid | 40 |
| 42 | Diethanolamine | 60 |
| | Azelacic acid | 40 |
| 43 | Diethanolamine | 60 |
| | Stearic acid | 40 |

In the following examples, the resulting moldings were tested for destaticizing ability by measuring the surface resistance of the discs in ohms per square of a molded disc and by an ash pick-up test. This test consists of rubbing the moldings vigorously with a woolen cloth, then holding the units over fresh, dry cigarette ashes and noting the distance at which any ashes may be picked up. Untreated polystyrene, under these conditions, picks up ashes at 2–2½ inches.

In order to point out more fully the nature of the present invention, the following specific examples are given of illustrative methods of preparing anti-static polymeric resin products falling within the scope of the present invention.

Example 1

100 grams of polystyrene beads sized to pass a 40 mesh screen and be retained on an 80 mesh screen, 20 grams of titanium dioxide (carrier No. 1) and 5 grams of N-acetylethanolamine (destaticizing agent No. 1) were charged into a 1 gallon ball mill with 2000 grams of one inch porcelain balls and milled for one hour at 60 revolutions per minute. The resulting powder was compression molded at 300° F. for 10 minutes under a pressure of 5000 pounds per square inch and cooled under pressure. The resulting disc-shaped molding readily dissipated static charges. Moldings which were stored for 2 months at 130° C. still dissipated static charges readily. The disc had a resistance of approximately 20 megohms per square and picked up ashes at ½". The discs retained their static dissipating power after being washed with soap and water.

Example 2

80 grams of the titanium dioxide (carrier No. 1) and 20 grams of N-acetylethanolamine (destaticizing agent No. 1) were charged into a 1 gallon ball mill with 2000 grams of one inch porcelain balls and milled for one hour at 60 revolutions pre minute. Then 200 grams of polystyrene beads, sized to pass a 40 mesh screen and be retained on an 80 mesh screen were added and the milling continued for a second hour. The resulting powder was extruded and chopped into pieces about ³⁄₃₂" in diameter and ⅛" long.

The resulting molding compound was injection molded at 350° F. and under a pressure of 2000 pounds per square inch in the form of poker chips.

The resultant chips were readily static dissipating. The surface resistance was greater than $10^9$ ohms per square. Ash pick-up was measured at ¾".

Example 3

3.5 pounds of finely divided silica (carrier No. 3) and 3.5 pounds of finely chopped polyethylene glycol (destaticizing agent No. 24) were blended in a sigma blade mixer. The resulting blend together with 87.5 pounds of ⅛" polystyrene molding granules were charged to a barrel mixer. After 2 hours of mixing, the mix was charged to the hopper of a twin screw extruder. The extruded material was then chopped into convenient sized molding granules and molded into discs approximately 2" in diameter and ¼" thick by means of a Van Dorn injection molding press. Resulting moldings were rubbed vigorously with a wool cloth. The discs were then held approximately ¼" from dry cigarette ashes. No pickup of ash was noted. The discs retained their static dissipating power after being washed with soap and water.

Example 4

1400 grams of polystyrene in ⅛" chips, 108 grams polyethylene glycol having an average molecular weight of 1540 (destaticizing agent No. 24) and 47 grams of finely divided silica (carrier No. 3) were charged simultaneously as a rough mixture of a Type 00 Banbury Mixer manufactured by Farrell-Birmingham Company. The mixer was run at 116 revolutions per minute. The ram pressure was 32 pounds per square inch. The maximum temperature reached during processing was 350° F. The charge was worked under the above conditions for 10 minutes.

The material was then sheeted on sheeting rolls and the sheets broken up into ¼" pieces. The pieces were used as a charge to an injection molding machine. Ash pick-up noted at ¼".

Dorn injection molding press. The moldings were thoroughly destaticized. No ash pick-up was noted.

A series of examples is described in the table below, in each of which the procedure of Example 1 was followed, the proportions being given in parts by weight:

| Example No. | Polymer | | Carrier | | Destat. Agent | | Results | |
|---|---|---|---|---|---|---|---|---|
| | No. | Parts | No. | Parts | No. | Parts | Ash Pickup, inches | Resistance, megohms per sq. |
| 6 | 1 | 100 | 1 | 15 | 1 | 2.5 | ¾ | 100 |
| 7 | 1 | 100 | 2 | 10 | 1 | 5 | <¼ | ¹ 100 |
| 8 | 1 | 100 | 2 | 30 | 1 | 3 | <¼ | ² >100 |
| 9 | 1 | 100 | 4 | 15 | 1 | 2.5 | >½ | 100 |
| 10 | 1 | 100 | 5 | 20 | 1 | 2.5 | ½ | 50 |
| 11 | 1 | 100 | 1 | 15 | 21 | 4 | ¾ | >100 |
| 12 | 1 | 100 | 2 | 30 | 22 | 6 | 1 | >1,000 |
| 13 | 1 | 100 | 2 | 30 | 25 | 5 | 1½ | >100 |
| 14 | 1 | 100 | 2 | 30 | 26 | 5 | 2½ | ³ N.G. |
| 15 | 1 | 100 | 2 | 30 | 33 | 5 | 2½ | ³ N.G. |
| 16 | 2 | 100 | 1 | 15 | 1 | 2.5 | ¼ | 500 |
| 17 | 4 | 100 | 1 | 15 | 1 | 2.5 | ¾ | >100 |
| 18 | 5 | 100 | 1 | 15 | 1 | 2.5 | ½ | 100 |
| 19 | 6 | 100 | 1 | 15 | 1 | 2.5 | <¼ | 50 |
| 20 | 1 | 100 | 1 | 15 | 3 | 5 | ¾ | 50 |
| 21 | 1 | 100 | 2 | 30 | 8 | 2.5 | 1½ | 1,000 |
| 22 | 1 | 100 | 1 | 20 | 12 | 5.0 | 1 | 100 |
| 23 | 1 | 100 | 1 | 20 | 13 | 5.0 | ½ | 100 |
| 24 | 1 | 100 | 1 | 20 | 16 | 5.0 | ½ | 50-100 |
| 25 | 1 | 100 | 2 | 30 | 17 | 5.0 | ½ | 1,000 |
| 26 | 1 | 100 | 2 | 30 | 20 | 5.0 | ½ | 100 |

¹ The moldings were very wet and appreciably weakened with respect to Example 1.
² By increasing carrier No. 2 concentration, the apparent wetness disappeared.
³ The static charge produced by rubbing with a wool cloth was not dissipated. In the case of Example No. 14 due to evaporation of the alcohol, and in Example No. 15 due to solvent action on the polymer.

Another series of examples is described in the table below, in each of which the procedure of Example 3 was followed, the proportions being given in parts by weight:

| Example No. | Resin | | Carrier | | Destat. Agent | | Results | |
|---|---|---|---|---|---|---|---|---|
| | No. | Parts | No. | Parts | No. | Parts | Ash Pickup, Inches | Resistance, megohms per sq. |
| 27 | 1 | 89 | 6 | 7 | 24 | 8.5 | ½ | 100 |
| 28 | 1 | 87.5 | 3 | 3.5 | 1 | 7.5 | 0-1/16 | 25 |
| 29 | 3 | 87.5 | 3 | 3.5 | 24 | 8.5 | ½ | 50 |
| 30 | 1 | 87.5 | 3 | 3.5 | 2 | 8.5 | ½ | ¹ 50 |
| 31 | 1 | 87.5 | 3 | 3.5 | 23 | 8.5 | ¼ | 50 |
| 32 | 1 | 87.5 | 3 | 3.5 | 27 | 8.5 | 1/16-⅛ | 25 |
| 33 | 1 | 87.5 | 3 | 3.5 | 27 | 4.2 | ⅛ | 50 |
| 34 | 1 | 87.5 | 3 | 3.5 | 28 | 4.2 | ⅛ | 25-50 |
| 35 | 1 | 87.5 | 3 | 3.5 | 29 | 4.2 | ⅛ | 50 |
| 36 | 1 | 87.5 | 3 | 3.5 | 30 | 4.2 | ⅛ | <50 |
| 37 | 6 | 87.5 | 3 | 3.5 | 24 | 8.5 | 1/16 | <50 |
| 38 | 1 | 87.5 | 3 | 3.5 | 4 | 4.2 | ½ | 100 |
| 39 | 1 | 87.5 | 3 | 3.5 | 5 | 6.3 | ¼ | 100 |
| 40 | 1 | 87.5 | 3 | 3.5 | 6 | 5.0 | ½ | 100 |
| 41 | 1 | 87.5 | 3 | 3.5 | 9 | 6.3 | ¼ | <100 |
| 42 | 1 | 87.5 | 3 | 3.5 | 10 | 6.3 | ½ | <100 |
| 43 | 1 | 87.5 | 3 | 3.5 | 11 | 6.3 | ¾ | 1000 |
| 44 | 1 | 87.5 | 3 | 3.5 | 14 | 5.0 | ½ | 50 |
| 45 | 1 | 87.5 | 3 | 3.5 | 15 | 4.2 | ½ | 100 |
| 46 | 1 | 87.5 | 3 | 3.5 | 18 | 6.3 | ¼ | 100 |
| 47 | 1 | 87.5 | 3 | 3.5 | 19 | 6.3 | ½ | 1000 |
| 48 | 1 | 87.5 | 3 | 3.5 | 31 | 8.5 | ½ | 100 |
| 49 | 1 | 87.5 | 3 | 3.5 | 32 | 8.5 | ½ | 50-100 |
| 50 | 1 | 87.5 | 1 | 15 | 35 | 3.0 | ¼ | 50 |
| 51 | 1 | 87.5 | 1 | 15 | 36 | 4.0 | ¼ | 50 |
| 52 | 1 | 87.5 | 1 | 15 | 37 | 3.0 | ¼ | <50 |
| 53 | 1 | 87.5 | 3 | 3.5 | 38 | 4.0 | ¼ | <50 |
| 54 | 1 | 87.5 | 3 | 3.5 | 39 | 5.0 | ½ | <50 |
| 55 | 1 | 87.5 | 3 | 3.5 | 40 | 4.5 | ½ | <50 |
| 56 | 1 | 87.5 | 3 | 3.5 | 42 | 5.0 | ½ | 100 |
| 57 | 1 | 87.5 | 1 | 15 | 43 | 5.0 | ¼ | 50 |

¹ When molded at 400° F., there was noted a tendency to gas due to decomposition of the formamide (B.P. 411° F. with decomposition) while no gassing occurred when molded at 300° F. Both units exhibited destaticizing properties.

*Example 5*

3 parts by weight of polyethylene glycol having a molecular weight of 400, 3.0 parts by weight of stearamidopropyl dimethyl-hydroxyethyl ammonium dihydrogen phosphate, 94.0 parts by weight of polystyrene beads, 3.6 parts by weight of the finely divided silica (carrier No. 3) and sufficient ethyl alcohol to make a heavy suspension of the whole were thoroughly mixed together and the whole dried by evaporation of the water and alcohol. The resulting molding compound was molded in a Van The foregoing examples and description are illustrative in intent. One skilled in the art will conceive of numerous variants of the processes and composition described which will fall within the scope of the invention as set forth in the following claims.

We claim:

1. The process of producing a product adapted to be molded into destaticized articles and consisting essentially of at least 50% by volume of a polymer of a vinylidene monomer selected from the group consisting of polystyrene, copolymers of vinylchloride and vinyl acetate, polyvinyl chloride, polyvinylidene chloride, polyethylene and polymethylmethacrylate and, in addition to the polymer, solid particles of a sorptive material having an electroconductive organic liquid sorbed on said particles which process consists of:

sorptively coating (a) solid particles of a chemically inert non-resinous sorptive material having a particle size smaller than 40 microns and a sorption factor of at least 0.5, with (b) a destaticizing agent consisting of a water soluble, electro-conductive, organic liquid having a conductivity greater than $10^{-9}$ mho/cm. at 20° C. and a vapor pressure below 760 mm. at 190° C., so as to sorb said organic liquid on said sorptive particles in a volume ratio of said organic liquid to said sorptive material not less than about 0.18 times and not exceeding 0.67 times the sorption factor;

and dispersing said sorptive material particles having said organic liquid destaticizing agent sorbed thereon, in said polymer, said organic liquid destaticizing agent being present in a quantity sufficient to impart electrical conductivity to articles molded from said resultant product whereby they are incapable of becoming electrostatically charged and constituting at least about 1 part of sorbed organic liquid, by volume per 100 parts of polymer, by volume; said polymer, said sorptive material, and said organic liquid being mutually non-reactive and stable under normal molding conditions for said polymer, said sorptive material being insoluble in said organic liquid and said polymer, said sorptive material being readily wetted by said organic liquid, and said organic liquid being at most partially soluble in said polymer.

2. The process of claim 1, wherein said organic destaticizing liquid is the product formed by bringing together an alkanolamine having fewer than nine carbon atoms in any group attached to the amine nitrogen and an acid selected from the group consisting of alkyl monocarboxylic acids having 2 to 18 carbon atoms in the molecule and alkyl dicarboxylic acids having 4 to 18 carbon atoms in the molecule.

3. The process of claim 1, wherein said organic destaticizing liquid is the product formed by bringing together an alkanolamine having fewer than nine carbon atoms in any group attached to the amine nitrogen and an aliphatic amide of an acid selected from the group consisting of alkyl monocarboxylic acids having 2 to 18 carbon atoms in the molecule and alkyl dicarboxylic acids having 4 to 18 carbon atoms in the molecule.

4. The process of claim 1, wherein said polymer is polystyrene.

5. The process of claim 1, wherein said polymer is polyvinyl chloride.

6. The process of claim 1, wherein said polymer is polyvinylidene chloride.

7. The process of claim 1, wherein said polymer is polyethylene.

8. The process of claim 1, wherein said polymer is polymethylmethacrylate.

9. The process of claim 1, wherein said sorptive material is titanium dioxide.

10. The process of claim 1, wherein said sorptive material is silicon dioxide.

11. The process of claim 1, wherein said sorptive material is magnesium carbonate.

12. The process of claim 1, wherein said sorptive material is diatomaceous earth.

13. The process of claim 1, wherein said organic liquid destaticizing agent is a polyalkanolamine.

14. The process of claim 1, wherein said organic liquid destaticizing agent is N-acetylethanolamine.

15. The process of claim 1, wherein said organic liquid destaticizing agent is polyethylene glycol.

16. The process of producing a product adapted to be molded into destaticized articles and consisting essentially of at least 50% by volume of a polymer of a vinylidene monomer selected from the group consisting of polystyrene, copolymers of vinylchloride and vinyl acetate, polyvinyl chloride, polyvinylidene chloride, polyethylene and polymethylmethacrylate and, in addition to the polymer, solid particles of a sorptive material having an electroconductive organic liquid sorbed on said particles which process consists of: sorptively coating solid particles of a chemically inert non-resonous sorptive material having a particle size smaller than 40 microns and a sorption factor of at least 0.5, with a destaticizing agent consisting of water soluble, electro-conductive, organic liquid having a conductivity greater than $10^{-9}$ mho/cm. at 20° C. and a vapor pressure below 760 mm. at 190° C., so as to sorb said organic liquid on said sorptive particles in a volume ratio of said organic liquid to said sorptive material not less than about 0.18 times and not exceeding 0.67 time the sorption factor; heating said polymer to melt the same; and dispersing said sorptive material particles having said organic liquid destaticizing agent sorbed thereon, in said molten polymer, said organic liquid destaticizing agent being present in a quantity sufficient to impart electrical conductivity to articles molded from said resultant product whereby they are incapable of becoming electrostatically charged and constituting at least about 1 part of sorbed organic liquid, by volume, per 100 parts of polymer, by volume; said polymer, said sorptive material and said organic liquid being mutually non-reactive and stable under normal molding conditions for said polymer, said sorptive material being one which is readily wetted by said organic liquid; said sorptive material being insoluble in said organic liquid and said polymer and said organic liquid being at most partially soluble in said polymer.

17. The process of producing a product adapted to be molded into destaticized articles and consisting essentially of at least 50% by volume of a polymer of a vinylidene monomer selected from the group consisting of polystyrene, copolymers of vinylchloride and vinyl acetate, polyvinyl chloride, polyvinylidene chloride, polyethylene and polymethylmethacrylate and, in addition to the polymer, solid particles of a sorptive material having an electroconductive organic liquid sorbed on said particles which process consists of: sorptively coating solid particles of a chemically inert non-resinous sorptive material having a particle size smaller than 40 microns and a sorption factor of at least 0.5, with a destaticizing agent consisting of water soluble, electroconductive, organic liquid having a conductivity greater than $10^{-9}$ mho/cm. at 20° C. and a vapor pressure below 760 mm. at 190° C., so as to sorb said organic liquid on said sorptive particles in a volume ratio of said organic liquid to said sorptive material not less than about 0.18 times and not exceeding 0.67 times the sorption factor; heating said polymer to melt same; dispersing said sorptive material particles having said organic liquid destaticizing agent sorbed thereon in said molten polymer; cooling the resulting composition until it is in a solid state; and comminuting said solid composition into molding pellets; said organic liquid destaticizing agent beng present in a quantity sufficient to impart electrical conductivity to articles molded from said molding pellets whereby said particles are incapable of becoming electrostatically charged, and constituting at least about 1 part of sorbed organic liquid, by volume, per 100 parts of polymer, by volume; said polymer, said sorptive material, and said organic liquid being mutually non-reactive and stable under normal molding conditions for said polymer, said sorptive material being insoluble in said organic liquid and said polymer and being readily wetted by said organic liquid.

18. The process of producing a product consisting of at least 50% by volume of a polymer of vinylidene monomer selected from the group consisting of polystyrene, copolymers of vinylchloride and vinyl acetate, polyvinyl chloride, polyvinylidene chloride, polyethylene and polymethylmethacrylate and adapted for molding destaticized articles, which process consists of: mixing particles of a chemically inert non-resinous sorptive material having a particles size smaller than 40 microns and a sorption factor of at least 0.5, a destaticizing agent consisting of a water soluble, electro-conductive, organic liquid having a conductivity greater than $10^{-9}$ mho/cm. at 20° C. and a vapor pressure below 760 mm. at 190° C., and particles of said polymer, thereby sorbing said organic liquid on said sorptive material, said organic liquid being present in a volume ratio to said sorptive material not less than about 0.18 times and not exceeding 0.67 times the sorption factor and dispersing said sorptive material particles, having said organic liquid destaticizing agent sorbed thereon, in said polymer; cooling the resulting composition, until it is in a solid state; comminuting said solid composition into molding pellets; said organic liquid destaticizing agent being present undissolved in said polymer in a quantity sufficient to impart electrical conductivity to articles molded from said molding pellets whereby said articles are incapable of becoming electrostatically charged and constituting at least about 1 part of sorbed liquid by volume, per 100 parts of polymer by volume; said polymer, said sorptive material and said organic liquid being mutually non-reactive and stable under normal molding conditions for said polymer, said sorptive material being insoluble in said organic liquid and said polymer being readily wetted by said organic liquid, and said organic liquid being at most partially soluble in said polymer.

References Cited by the Examiner

UNITED STATES PATENTS 2,564,992  8/1951  Pechukas _____ 260—33.4
2,692,869  10/1954  Pechukas.
2,993,022  7/1961  Coler.

MORRIS LIEBMAN, *Primary Examiner.*

L. T. JACOBS, *Assistant Examiner.*